(12) United States Patent
Morita

(10) Patent No.: US 9,348,332 B2
(45) Date of Patent: May 24, 2016

(54) ABNORMALITY DIAGNOSIS DEVICE AND ABNORMALITY DIAGNOSIS SYSTEM FOR SERVO CONTROL DEVICE

(75) Inventor: Shogo Morita, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 509 days.

(21) Appl. No.: 13/978,270

(22) PCT Filed: Mar. 29, 2011

(86) PCT No.: PCT/JP2011/057842
§ 371 (c)(1),
(2), (4) Date: Jul. 3, 2013

(87) PCT Pub. No.: WO2012/131909
PCT Pub. Date: Oct. 4, 2012

(65) Prior Publication Data
US 2013/0297049 A1 Nov. 7, 2013

(51) Int. Cl.
*G05B 23/02* (2006.01)
*G05B 9/02* (2006.01)
*G06F 11/22* (2006.01)

(52) U.S. Cl.
CPC ............ *G05B 23/0272* (2013.01); *G05B 9/02* (2013.01); *G05B 23/027* (2013.01); *G06F 11/2257* (2013.01)

(58) Field of Classification Search
CPC ............ G05B 23/027; G05B 23/0272; G06F 11/2257
See application file for complete search history.

(56) References Cited

U.S. PATENT DOCUMENTS 5,127,005 A * 6/1992 Oda .................... G06F 11/2257
706/916
5,521,842 A 5/1996 Yamada
(Continued)

FOREIGN PATENT DOCUMENTS

JP 01156680 A * 6/1989
JP 01243746 A * 9/1989
(Continued)

OTHER PUBLICATIONS

Japanese Office Action (Notice of Rejection) dated Oct. 25, 2011, Patent Application No. 2011-533892.
(Continued)

*Primary Examiner* — Crystal J Barnes-Bullock
(74) *Attorney, Agent, or Firm* — Sughrue Mion, PLLC; Richard C. Turner

(57) ABSTRACT

An abnormality diagnosis device includes a factor-data storage unit that stores therein factor data including a candidate of an alarm-generating factor corresponding to an alarm number; a stored-data storage unit that stores therein, as stored data, statistical data acquired from a statistical data server including the alarm number corresponding to a system configuration number of a servo control device classified based on a system configuration of the servo control device, and a candidate of the alarm-generating factor corresponding to the alarm number, and a generation probability of the candidate; a display unit; and an abnormality-diagnosis processing unit that acquires the alarm number from the servo control device when an alarm is generated, and based on the alarm number, the factor data, and the stored data, adds the generation probability to each candidate and displays, on the display unit, the candidate with the generation probability added.

5 Claims, 5 Drawing Sheets

(56) References Cited

U.S. PATENT DOCUMENTS

| | | |
|---|---|---|
| 7,177,821 B2 | 2/2007 | Ikeda et al. |
| 2002/0065749 A1 | 5/2002 | Ikeda et al. |
| 2004/0138967 A1 | 7/2004 | Ikeda et al. |
| 2005/0012608 A1 | 1/2005 | Havekost et al. |
| 2007/0067678 A1 | 3/2007 | Hosek et al. |
| 2008/0140435 A1 | 6/2008 | Arakawa |

FOREIGN PATENT DOCUMENTS

| | | | | |
|---|---|---|---|---|
| JP | 02002406 A | * | 1/1990 | |
| JP | 02-096205 A | | 4/1990 | |
| JP | 03-081804 A | | 4/1991 | |
| JP | 06-162218 A | | 6/1994 | |
| JP | 07-234987 A | | 9/1995 | |
| JP | 07-241896 A | | 9/1995 | |
| JP | 2002-041131 A | | 2/2002 | |
| JP | 2002-154085 A | | 5/2002 | |
| JP | 2002-351538 A | | 12/2002 | |
| JP | 2006-059236 A | | 3/2006 | |
| JP | 2006-120037 A | | 5/2006 | |
| JP | 2007-293489 A | | 11/2007 | |
| JP | 2008-202898 A | | 9/2008 | |
| JP | 4570656 B2 | | 10/2010 | |
| JP | 4948679 B1 | * | 6/2012 | G05B 23/027 |
| JP | WO 2012013190 A1 | * | 10/2012 | G05B 23/027 |
| JP | KR 20130114750 A | * | 10/2013 | G05B 23/027 |
| JP | KR 101418229 B1 | * | 7/2014 | G05B 23/027 |
| TW | 200805018 A | | 1/2008 | |
| WO | 2006/085469 A1 | | 8/2006 | |

OTHER PUBLICATIONS

Korean Office Action (Notice of Preliminary Rejection) dated Feb. 7, 2014, Patent Application No. 10-2013-7024912.

Taiwanese Office Action, mailed Dec. 6, 2013, Application No. 100120327.

Communication dated Jul. 15, 2014, issued by the State Intellectual Property Office of the People's Republic of China in counterpart Application No. 201180069584.2.

* cited by examiner

FIG.3

| SYSTEM CONFIGURATION NUMBER | ALARM NUMBER | ALARM FACTOR NUMBER | PROBA-BILITY |
|---|---|---|---|
| 01 (~~ SYSTEM) | 01 (○○ ABNORMALITY) | 01 | 20% |
| | | 02 | 10% |
| | | 03 | 70% |
| | 02 (△△ ABNORMALITY) | 01 | 45% |
| | | 02 | 15% |
| | | 03 | 20% |
| | | 04 | 20% |
| | ⋮ | ⋮ | ⋮ |
| 02 (✱✱ SYSTEM) | 01 (○○ ABNORMALITY) | 01 | 20% |
| | | 02 | 20% |
| | | 03 | 60% |
| | 02 (△△ ABNORMALITY) | 01 | 40% |
| | | 02 | 15% |
| | | 03 | 20% |
| | | 04 | 20% |
| | | 05(ADDITIONAL FACTOR) | 5% |
| | ⋮ | ⋮ | ⋮ |
| ⋮ | ⋮ | ⋮ | ⋮ |

207

ABNORMALITY DIAGNOSIS DEVICE AND ABNORMALITY DIAGNOSIS SYSTEM FOR SERVO CONTROL DEVICE

CROSS REFERENCE TO RELATED APPLICATIONS

This application is a National Stage of International Application No. PCT/JP2011/057842 filed Mar. 29, 2011, the contents of all of which are incorporated herein by reference in their entirety.

FIELD

The present invention relates to an abnormality diagnosis device and an abnormality diagnosis system for a servo control device used in industrial device, and more particularly to a technique for enabling collection, distribution, and use of troubleshooting data for the servo control device via the Internet.

BACKGROUND

In a conventional type of abnormality diagnosis for a servo control device, when there is an abnormality in a servo control device, a self-diagnosis function of the servo control device generates an alarm in the servo control device and outputs an alarm number corresponding to a type of the abnormality. When the alarm is generated, an abnormality diagnosis device is connected to the servo control device, so that an alarm-generating factor candidate can be displayed on a display screen of the abnormality diagnosis device. At this time, in order to identifying one alarm-generating factor with respect to one alarm number, a large number of alarm numbers need to be prepared. This is difficult due to a restriction on the self-diagnosis performance of the servo control device. Therefore, in practice, a plurality of alarm-generating factor candidates are displayed on the screen with respect to one alarm number, so that a person who handles the abnormality needs to find a true alarm-generating factor out of the alarm-generating factor candidates displayed on the screen.

In Patent Literature 1, a configuration for updating a database concerning a failure diagnosis based on information on a failure and a measure against the failure is disclosed. In a case where this is applied to the abnormality diagnosis device for a servo control device, when an alarm is generated in the servo control device and then the generated alarm is cleared, the corresponding troubleshooting data can be accumulated in the abnormality diagnosis device as stored data. In this configuration, when an alarm is generated so that the alarm is to be cleared, a probability for a displayed alarm-generating factor candidate to be the true alarm-generating factor can be added, based on the stored data, to each of the alarm-generating factor candidates displayed on the screen of the abnormality diagnosis device. This enables a person who handles the abnormality to perform an efficient recovery of the servo control device by searching the alarm-generating factor candidates in order of the probability from high to low when searching the true alarm-generating factor.

In Patent Literature 2, a configuration for a user and a manufacturer to use maintenance information stored in a server via the Internet regarding maintenance information of a power generation facility is disclosed. Regarding an abnormality not only in a servo control device but also in a general system machine, a person who handles the abnormality provides, after solving the abnormality, information on solving the abnormality to a statistical data server. This enables another person who handles an abnormality to use the information. By accumulating the information provided by information providers, a database on the troubleshooting is established, and a person who handles an abnormality can efficiently solve an abnormality generated in his or her system or machine by using the database.

CITATION LIST

Patent Literatures

Patent Literature 1: Japanese Patent Application Laid-open No. 7-234987
Patent Literature 2: Japanese Patent Application Laid-open No. 2002-41131

SUMMARY

Technical Problem

However, in the conventional techniques mentioned above, for example, in the configuration disclosed in Patent Literature 1, sufficient data needs to be accumulated as the stored data in order to perform an efficient recovery. Because the stored data is not sufficient for an alarm that has not been generated so far in the servo control device in which the alarm is generated or for an alarm that is generated when adjusting the servo control device at the time of start, there is a problem in that a probability with high reliability cannot be displayed and an efficient recovery cannot be expected.

For example, in a case where the configuration disclosed in Patent Literature 2 is applied to the abnormality diagnosis of the servo control device, the contents of data provided to the statistical data server and means for providing the data are not clearly determined when providing the troubleshooting data of the servo control device to the statistical data server via the Internet. Accordingly, a provider needs to consider the contents of the data to be provided, and describe and provide the data manually. Therefore, there is a problem in that the database on the troubleshooting cannot be actively established.

When an alarm is generated in the servo control device, a plurality of alarm-generating factor candidates are displayed on a screen of an abnormality diagnosis device, and thus, after a true alarm-generating factor is determined, unnecessary information is still displayed on the screen. When the amount of information is increased, all the information cannot be displayed on a single screen, and thus an operation of switching the screen or scrolling the screen is required in order to display necessary information. Therefore, when two or more pieces of information are displayed on different screens, an effort is required to switch the screen every time a user checks the information.

The present invention has been achieved in view of the above problems, and an object of the present invention is to provide an abnormality diagnosis device and an abnormality diagnosis system for a servo control device so that a user can efficiently handle an alarm.

Solution to Problem

There is provided an abnormality diagnosis device according to an aspect of the present invention for a servo control device that is connected to the servo control device and a statistical data server, the abnormality diagnosis device including: a factor-data storage unit that stores therein factor data including a candidate of an alarm-generating factor corresponding to an alarm number that indicates a type of an alarm in the servo control device; a stored-data storage unit that stores therein, as stored data, statistical data acquired from the statistical data server, the statistical data including the alarm number corresponding to a system configuration number of the servo control device classified based on a system configuration of the servo control device, a candidate of the alarm-generating factor corresponding to the alarm number, and a generation probability of the candidate of the alarm-generating factor; a display unit; and an abnormality-diagnosis processing unit that acquires the alarm number from the servo control device when an alarm is generated, and based on the alarm number, the factor data, and the stored data, adds the generation probability to each candidate of the alarm-generating factor and displays, on the display unit, the candidate of the alarm-generating factor with the generation probability added.

Advantageous Effects of Invention

According to the present invention, a user can efficiently handle an alarm of a servo control device.

BRIEF DESCRIPTION OF DRAWINGS

FIG. 3 depicts a data configuration of statistical data.

DESCRIPTION OF EMBODIMENTS

Exemplary embodiments of an abnormality diagnosis device for a servo control device and abnormality diagnosis of an abnormality diagnosis system according to the present invention will be explained below in detail with reference to the accompanying drawings. The present invention is not limited to the embodiments.

Embodiment

Figure 1:
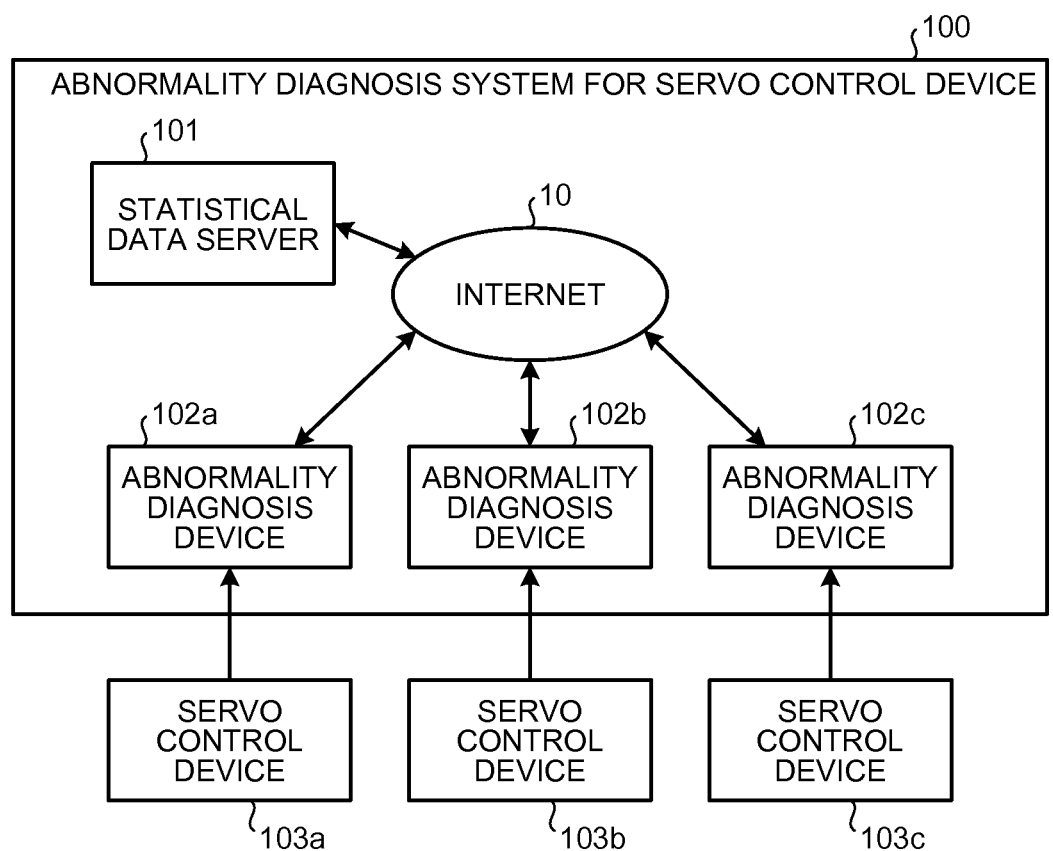
FIG. 1 is a schematic configuration diagram of an abnormality diagnosis system for a servo control device.

FIG. 1 is a schematic configuration diagram of an abnormality diagnosis system 100 for a servo control device according to an embodiment of the present invention. The abnormality diagnosis system 100 for a servo control device includes a statistical data server 101, an unspecified number of abnormality diagnosis devices 102a to 102c respectively connected to servo control devices 103a to 103c, in which the abnormality diagnosis devices 102a to 102c can be connected to the statistical data server 101 via the Internet 10.

Figure 2:
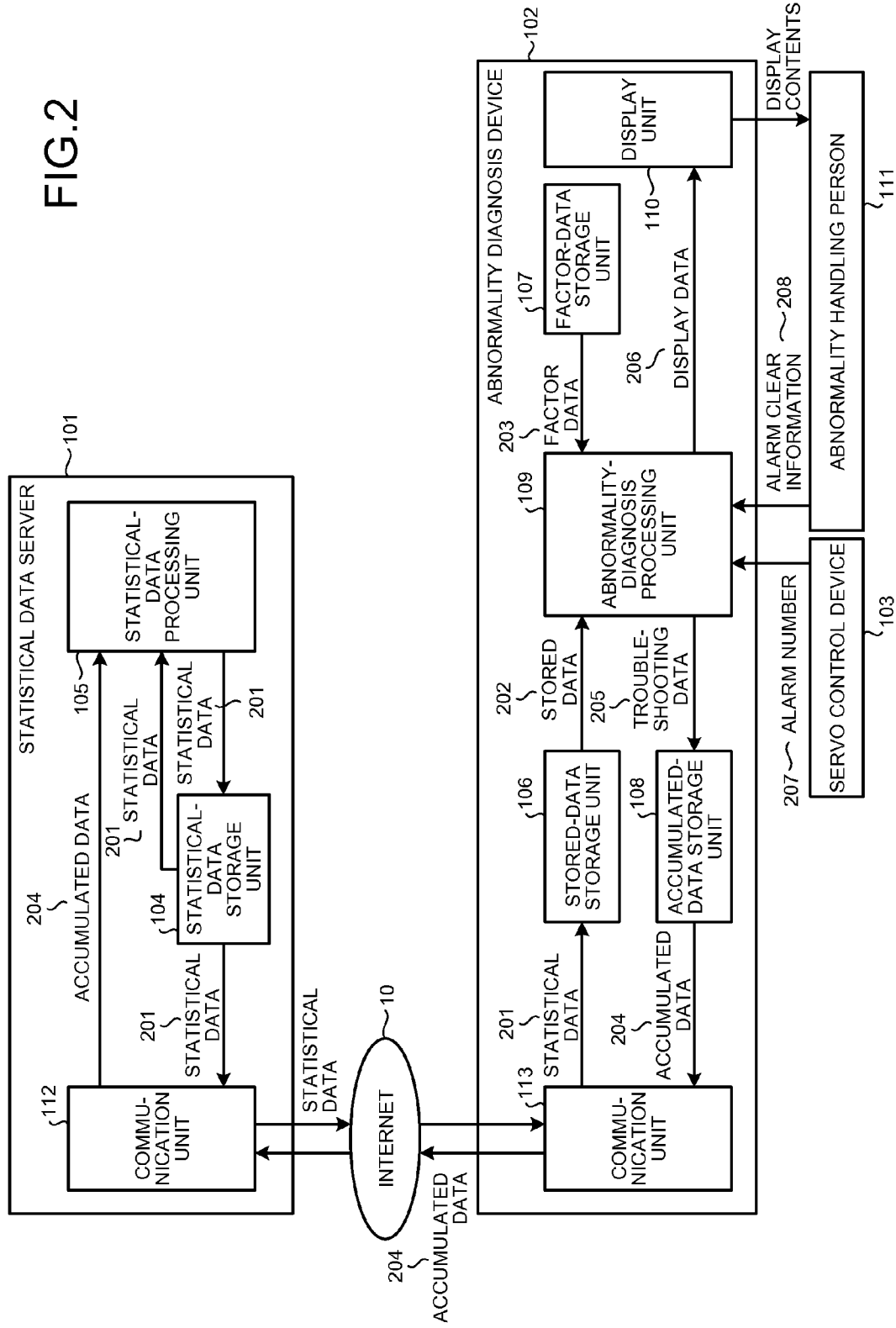
FIG. 2 depicts detailed internal configurations of a statistical data server and an abnormality diagnosis device and a flow of information therebetween.

FIG. 2 depicts detailed internal configurations of the statistical data server 101 and an abnormality diagnosis device 102 and flows of information therebetween in the abnormality diagnosis system 100 for a servo control device. A statistical-data storage unit 104 of the statistical data server 101 stores therein alarm-generating factor candidates with respect to an alarm number that indicates a type of an alarm and a probability of being a true alarm-generating factor determined for each alarm-generating factor candidate as statistical data 201.

A stored-data storage unit 106 of the abnormality diagnosis device 102 stores therein in advance the statistical data 201 at the time of factory shipping the abnormality diagnosis device 102 as stored data 202. A factor-data storage unit 107 of the abnormality diagnosis device 102 stores therein in advance alarm-generating factor candidates for all alarm numbers and counter-alarm measures respectively corresponding to the alarm-generating factor candidates as factor data 203 at the time of factory shipping the abnormality diagnosis device 102.

When an abnormality handling person 111 (a user) has cleared an alarm of the servo control device 103 by using the abnormality diagnosis device 102, troubleshooting data 205 including an alarm number 207 and an alarm clear information 208 corresponding to the alarm number 207 is transmitted to an accumulated-data storage unit 108 via an abnormality-diagnosis processing unit 109.

The statistical data server 101 receives accumulated data 204 by a communication unit 112 of the statistical data server 101 at an arbitrary timing from the accumulated-data storage unit 108 via a communication unit 113 of the abnormality diagnosis device 102 and the Internet 10. Furthermore, the statistical data server 101 updates the statistical data 201 obtained from the statistical-data storage unit 104 by using a statistical-data processing unit 105, based on the accumulated data 204 transmitted from the communication unit 112. In addition, the statistical data server 101 can add a new alarm-generating factor candidate to the statistical data 201 based on a comment provided from the abnormality handling person 111. The statistical data 201 to which update and addition are performed by the statistical-data processing unit 105 is stored again in the statistical-data storage unit 104. With this operation, the statistical data 201 in the statistical-data storage unit 104 is gradually updated to data with high reliability by receiving the accumulated data from the unspecified number of abnormality diagnosis devices.

The abnormality handling person 111 can cause the abnormality diagnosis device 102 to receive the statistical data 201 of the statistical data server 101 at an arbitrary timing by connecting the abnormality diagnosis device 102 to the Internet 10. The statistical data 201 received by the abnormality diagnosis device 102 is stored in the stored-data storage unit 106 of the abnormality diagnosis device 102 as the stored data 202. By using this configuration, even when an environment when handling an alarm does not allow the abnormality diagnosis device 102 to be connected to the Internet 10 due to a restriction on an installation site of the servo control device 103, an efficient recovery can be achieved by connecting the abnormality diagnosis device 102 to the Internet 10 and updating the stored data 202 in advance.

FIG. 3 depicts a data configuration of the statistical data 201. The statistical data 201 includes a system configuration number that indicates a brief system configuration of the servo control device 103 classified in advance, the alarm number 207, an alarm factor number that indicates an alarm-generating factor, and a probability of the alarm-generating factor corresponding to the alarm factor number. The probability of the alarm-generating factor included in the statistical data 201 is determined based on statistics from the past and updated by the data provided from the unspecified number of abnormality diagnosis devices. Furthermore, a new alarm-generating factor for the alarm number 207 can be added by the provision of the data.

Figure 4:
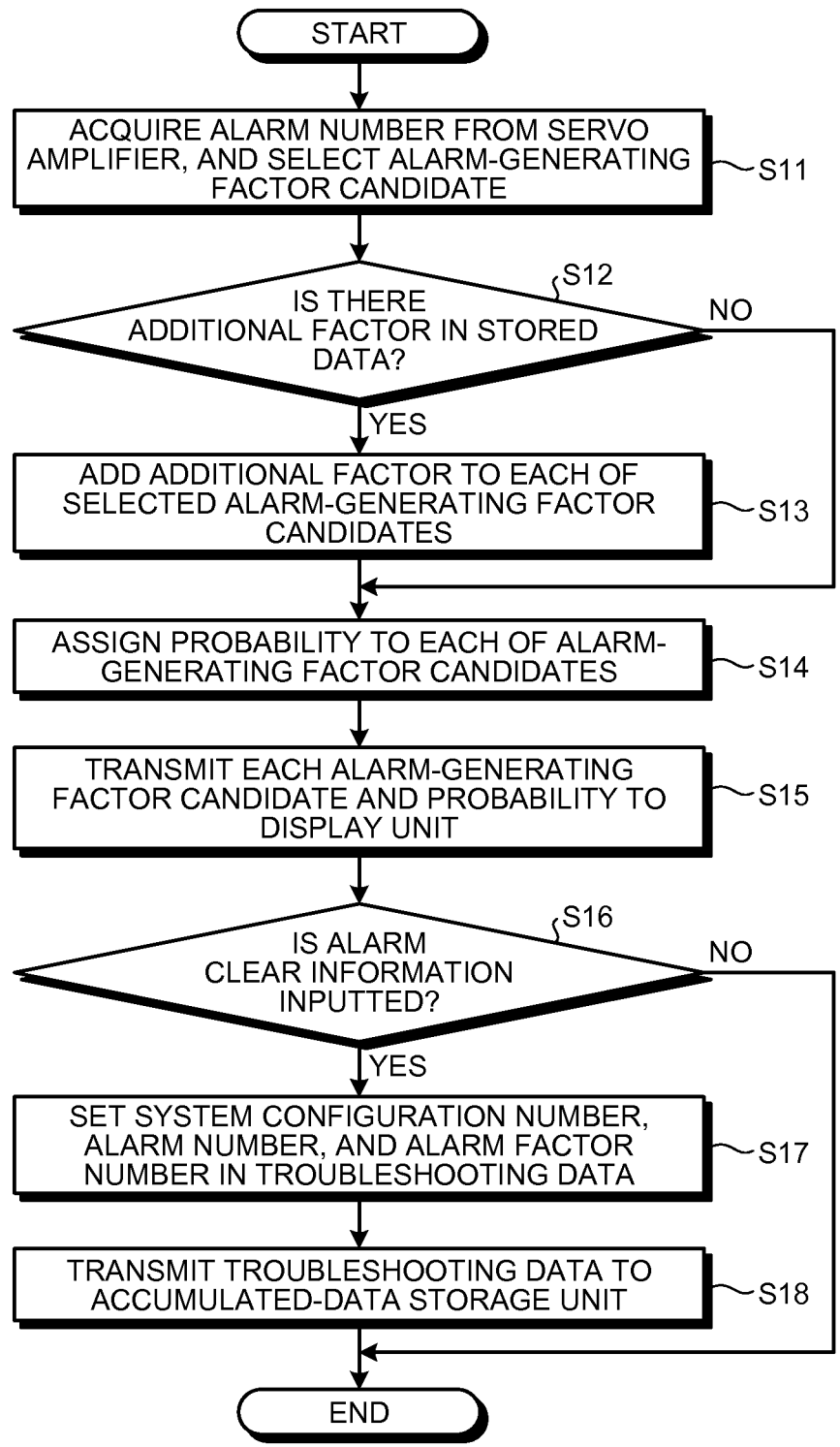
FIG. 4 is a flowchart of a process performed by an abnormality-diagnosis processing unit of the abnormality diagnosis device.

FIG. 4 is a flowchart of a process performed by the abnormality-diagnosis processing unit 109 of the abnormality diagnosis device 102 when an alarm is generated in the servo control device 103.

Processes of the steps in the flowchart shown in FIG. 4 are each described below in detail.

First, at Step S11, the abnormality-diagnosis processing unit 109 selects an alarm-generating factor candidate corresponding to the alarm number 207 from the factor data 203 stored in advance in the factor-data storage unit 107, based on the alarm number 207 received from a servo amplifier of the servo control device 103.

Next, at Step S12, the abnormality-diagnosis processing unit 109 determines whether there is an alarm-generating factor to be added to the alarm-generating factor candidate selected from the factor data 203, by referring to the stored data 202 received from the stored-data storage unit 106. When there is an alarm-generating factor to be added (YES at Step S12), the abnormality-diagnosis processing unit 109 adds an additional factor to the alarm-generating factor candidate selected from the alarm number 207 at Step S13, and proceeds to Step S14. When there is no additional factor to be added (NO at Step S12), the process proceeds to Step S14.

The stored data 202 is the statistical data 201 acquired from the statistical data server 101 in the past, and its data configuration is the same as that shown in FIG. 3. Therefore, because the presence of the additional factor can be different for each system configuration number, it is required to specify the system configuration number. The system configuration number can be freely specified by the abnormality handling person 111. Therefore, it suffices to specify a system configuration number that is closest to the system configuration of the servo control device 103.

At Step S14, the abnormality-diagnosis processing unit 109 assigns the probability to each selected alarm-generating factor candidate based on the stored data 202.

At Step S15, the abnormality-diagnosis processing unit 109 of the abnormality diagnosis device 102 transmits the selected alarm-generating factor candidate, the counter-alarm measure, and the assigned probability as display data 206 to a display unit 110 shown in FIG. 2.

Due to the probability added to each of the alarm-generating factor candidates displayed on the display unit 110, even though a plurality of alarm-generating factor candidates are displayed, the abnormality handling person 111 can perform an efficient recovery of the servo control device 103 by performing the counter-alarm measures to the alarm-generating factor candidates from an alarm-generating factor candidate having a higher probability.

At Step S16, the abnormality-diagnosis processing unit 109 determines whether there is an input of the alarm clear information 208 from the abnormality handling person 111 who has cleared the alarm. The alarm clear information 208 includes an alarm factor number of the alarm-generating factor for which the alarm has been cleared and a system configuration number. In order for the abnormality handling person 111 to input the alarm clear information 208, it suffices to select one from the alarm-generating factor candidates and one from the system configurations displayed on the display unit 110. When there is no corresponding one in the alarm-generating factor candidates displayed on the display unit 110 and it has been found that the alarm has been generated from a different factor, the abnormality handling person 111 can describe the contents of the factor as a comment and take the description of the contents as the alarm clear information 208.

At Step S16, when there is an input of the alarm clear information 208 in the abnormality-diagnosis processing unit 109 (YES at Step S16), the process proceeds to Step S17. When there is no input of the alarm clear information 208 (NO at Step S16), the abnormality-diagnosis processing unit 109 ends the process because the abnormality-diagnosis processing unit 109 cannot create the troubleshooting data 205 (END). However, in this case, the alarm number 207 can be stored as an alarm history so that the abnormality handling person 111 can create the troubleshooting data 205 from the alarm history later.

At Step S17, the abnormality-diagnosis processing unit 109 creates the troubleshooting data 205. The troubleshooting data 205 includes the alarm number 207 received by the abnormality-diagnosis processing unit 109 and the alarm clear information 208 inputted to the abnormality-diagnosis processing unit 109.

At Step S18, the abnormality-diagnosis processing unit 109 transmits the created troubleshooting data 205 to the accumulated-data storage unit 108, and ends the process.

With the processes mentioned above, by a repetition of the generation of an alarm and the clearing of the alarm in the servo control device 103, there is constituted the accumulated data 204 that is a collection of a plurality of pieces of troubleshooting data. The accumulated data 204 can be transmitted to the statistical data server 101 at an arbitrary timing via the communication unit 113 by connecting the abnormality diagnosis device 102 to the Internet 10.

Figure 5:
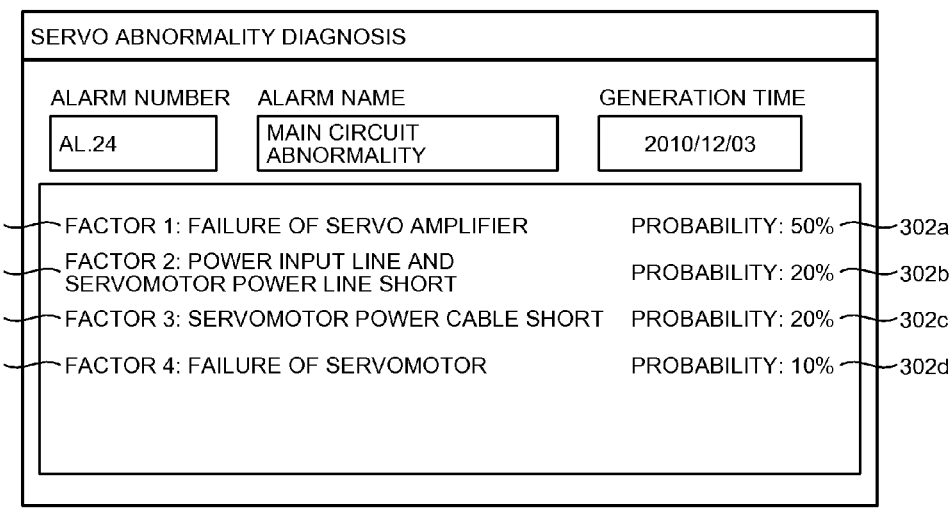
FIG. 5 depicts servo-abnormality diagnosis screens displayed on a display unit of the abnormality diagnosis device.
Figure 6:
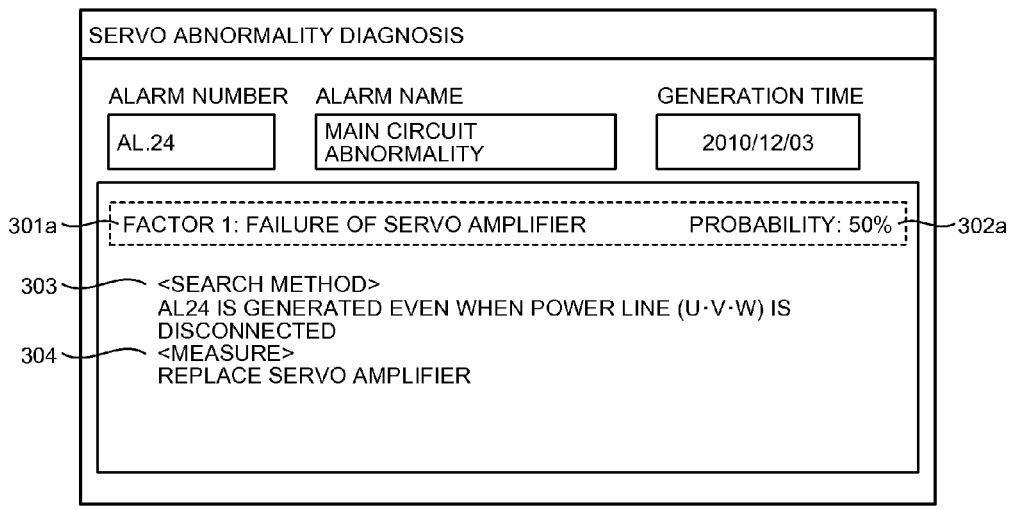
FIG. 6 depicts a servo-abnormality diagnosis screen when one of the alarm-generating factor candidates is selected in the servo-abnormality diagnosis screens.

FIGS. 5 and 6 depict servo-abnormality diagnosis screens displayed on the display unit 110 of the abnormality diagnosis device 102.

In FIG. 5, alarm-generating factor candidates 301a to 301d are displayed, and probabilities 302a to 302d of being the true alarm-generating factor are added to the alarm-generating factor candidates 301a to 301d, respectively.

FIG. 6 depicts a servo-abnormality diagnosis screen when the alarm-generating factor candidate 301a shown in FIG. 5 is selected. In this case, the other alarm-generating factor candidates 301b to 301d are hidden, and it is possible to display a search method 303 and a measure 304 with respect to the alarm-generating factor candidate 301a on the same screen. With this configuration, the necessary information can be checked without changing or scrolling the screen.

In this manner, in the present embodiment, there is established an abnormality diagnosis system which includes a statistical data server that can store the troubleshooting data of the servo control device as the statistical data and a plurality of servo control devices each being capable of storing the statistical data on the statistical data server as the stored data therein, and capable of exchanging data between the statistical data server and the abnormality diagnosis device via the Internet. The contents of the data exchanged between the statistical data server and the abnormality diagnosis device is determined based on the characteristics of the servo control device.

When an alarm is generated in the servo control device and the generated alarm is cleared, the troubleshooting data including the alarm number and the alarm clear information is automatically stored every time as the accumulated data in the abnormality diagnosis device.

Furthermore, when one alarm-generating factor candidate is selected from a plurality of alarm-generating factor candidates displayed on the screen of the abnormality diagnosis device, the alarm-generating factor candidates that are not selected from among the various pieces of information displayed on the screen are hidden, and the search method and the measure only for the selected alarm-generating factor candidate are displayed on the screen in detail.

With this configuration, the abnormality diagnosis joined the abnormality diagnosis system via the Internet can easily obtain the statistical data of the troubleshooting from the statistical data server as the stored data. When an alarm is generated in the servo control device, the abnormality diagnosis device can add the probability to the alarm-generating factor candidate and display the alarm-generating factor candidate with the probability added and to display a specific recovery procedure based on the alarm number and the stored data. The abnormality handling person of the servo control device can efficiently perform the measure against the alarm.

That is, based on the prepared accumulated data, by assigning a predicted generation probability to each of the alarm-generating factors displayed on a troubleshooting screen of an engineering tool, the abnormality handling person as a user can efficiently identify the true factor so that time and effort required for the recovery of the servo system can be reduced. By graphically displaying a place where there is a possibility of an abnormality generated in the servo system by using a model of the system, the user can intuitively figure out an abnormality-generated place.

The statistical data on the statistical data server is stored in advance at the time of factory shipping the abnormality diagnosis device as the stored data in the abnormality diagnosis device. With this configuration, even though the abnormality diagnosis device is used in an environment where the Internet is not available, it is possible to efficiently perform the measure against the alarm of the servo control device.

Furthermore, when an alarm is generated in the servo control device and the generated alarm is cleared, the troubleshooting data is automatically stored in the abnormality diagnosis device as the accumulated data, and thus the user does not need to make any special effort when providing the accumulated data to the statistical data server via the Internet. Therefore, the accumulated data can be easily provided from the abnormality diagnosis device to the statistical data server so that an active information provision can be expected.

Further, when one alarm-generating factor candidate is selected from a plurality of alarm-generating factor candidates displayed on the screen of the abnormality diagnosis device, the alarm-generating factor candidates that are not selected from among the various pieces of information displayed on the screen are hidden, and only the selected alarm-generating factor candidate is displayed on the screen in detail, and thus the effort of scrolling the screen or the like can be omitted.

As described above, with the abnormality diagnosis device and the abnormality diagnosis system for a servo control device according to the present embodiment, it is possible to efficiently solve abnormalities generated due to start-up and temporal degradation of the servo control device. This enables a reduction of man-hour in the start and a reduction of man-hour in maintenances to be expected.

Furthermore, because the diagnosis information regarding the servo control device can be easily collected, it is expected to lead to a development of an excellent product having less generation of abnormalities by analyzing collected diagnosis information and reflecting a point having an improvement effect on a new product.

The present invention is not limited to the embodiments described above and various modifications can be appropriately made without departing from the scope of the invention at implementation stages. In addition, in the above embodiments, inventions of various stages are included, and various inventions can be extracted by appropriately combining a plurality of constituent elements disclosed herein.

For example, even when some constituent elements are omitted from all constituent elements described in the embodiments, as far as the problems mentioned in the section of Solution to Problem can be solved and effects mentioned in the section of Advantageous Effects of Invention are obtained, the configuration from which these constituent elements have been omitted can be extracted as an invention. Furthermore, constituent elements of the embodiments can be appropriately combined.

INDUSTRIAL APPLICABILITY

As described above, the abnormality diagnosis device and the abnormality diagnosis system for a servo control device according to the present invention are useful for an abnormality diagnosis device corresponding to a plurality of servo control devices, and are particularly suitable for an environment in which a plurality of abnormality diagnosis devices respectively corresponding to a plurality of servo control devices are connected via the Internet.

REFERENCE SIGNS LIST

10 Internet
100 abnormality diagnosis system for servo control device
101 statistical data server
102 abnormality diagnosis device
102a abnormality diagnosis device
102b abnormality diagnosis device
102c abnormality diagnosis device
103 servo control device
103a servo control device
103b servo control device
103c servo control device
104 statistical-data storage unit
105 statistical-data processing unit
106 stored-data storage unit
107 factor-data storage unit
108 accumulated-data storage unit
109 abnormality-diagnosis processing unit
110 display unit
111 abnormality handling person
112 communication unit
113 communication unit
201 statistical data
202 stored data
203 factor data
204 accumulated data
205 troubleshooting data
206 display data
207 alarm number
208 alarm clear information
301a alarm-generating factor candidate
301b alarm-generating factor candidate
301c alarm-generating factor candidate
301d alarm-generating factor candidate
302a probability of being true alarm-generating factor
302b probability of being true alarm-generating factor
302c probability of being true alarm-generating factor
302d probability of being true alarm-generating factor
303 alarm-generating factor search method
304 measure with respect to alarm

The invention claimed is:

1. An abnormality diagnosis device for a servo control device that is connected to the servo control device and a statistical data server, the abnormality diagnosis device comprising:

a factor-data storage unit that stores therein factor data including at least one candidate of an alarm-generating factor corresponding to an alarm number that indicates a type of an alarm in the servo control device and a counter-alarm measure to handle the alarm-generating factor;

a stored-data storage unit that stores therein, as stored data, statistical data acquired from the statistical data server, the statistical data including the alarm number corresponding to a system configuration number of the servo control device classified based on a system configuration of the servo control device, a candidate of the alarm-generating factor corresponding to the alarm number, and a generation probability of the candidate of the alarm-generating factor;

a display unit; and an abnormality-diagnosis processing unit that acquires the alarm number from the servo control device when an alarm is generated, and based on the alarm number, the factor data, and the stored data, adds the generation probability, a search method for the alarm-generating factor, and the counter-alarm measure to each of the at least one candidate of the alarm-generating factor and displays, on the display unit, the candidate of the alarm-generating factor with the generation probability added.

2. The abnormality diagnosis device according to claim 1, wherein when a user selects one of candidates of the alarm-generating factor displayed, the abnormality-diagnosis processing unit displays the counter-alarm measure to handle the alarm-generating factor on the display unit and hides rest of the candidates.

3. The abnormality diagnosis device according to claim 1, wherein the stored-data storage unit makes a connection to the statistical data server via the Internet, acquires the statistical data at an arbitrary timing, and updates the stored data with the acquired statistical data.

4. The abnormality diagnosis device according to claim 3, further comprising an accumulated data storage unit that stores therein, as accumulated data, the system configuration number and the alarm-generating factor inputted to the abnormality-diagnosis processing unit by a user and troubleshooting data including the alarm number of an alarm that is cleared by the user when the user clears the alarm generated in the servo control device, and provides the accumulated data to the statistical data server via the Internet at an arbitrary timing.

5. An abnormality diagnosis system comprising:

at least one abnormality diagnosis device for a servo control device according to claim 4; and the statistical data server that updates the statistical data based on the accumulated data.

* * * * *